US012639954B2

(12) United States Patent
Nagori et al.

(10) Patent No.: US 12,639,954 B2
(45) Date of Patent: May 26, 2026

(54) EFFICIENT BIRDS-EYE VIEW (BEV) GENERATION IN VEHICULAR SYSTEMS

(71) Applicant: QUALCOMM Incorporated, San Diego, CA (US)

(72) Inventors: Soyeb Noormohammed Nagori, San Diego, CA (US); Seok-Soo Hong, Seoul (KR); Youngsaeng Jin, Seoul (KR); Sanghyuk Lee, Seoul (KR); Ajit Venkat Rao, San Diego, CA (US); Jihad Masri, Mississauga (CA); Andreas Eidehall, Linköping (SE); Jacob Roll, Linköping (SE); Per Cronvall, Linköping (SE); Gustav Nils Ture Persson, Ljungsbro (SE); Peter Leif Lindskog, Linköping (SE)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 18/677,451

(22) Filed: May 29, 2024

(65) Prior Publication Data

US 2024/0355125 A1     Oct. 24, 2024

Related U.S. Application Data

(63) Continuation-in-part of application No. 18/492,439, filed on Oct. 23, 2023.

(Continued)

(51) Int. Cl.
| | |
|---|---|
| *G06V 20/56* | (2022.01) |
| *G06T 7/50* | (2017.01) |
| *G06V 10/24* | (2022.01) |

(52) U.S. Cl.
CPC ............... *G06V 20/56* (2022.01); *G06T 7/50* (2017.01); *G06V 10/245* (2022.01)

(58) Field of Classification Search
None
See application file for complete search history.

(56) References Cited

U.S. PATENT DOCUMENTS

| | | |
|---|---|---|
| 9,258,550 B1 | 2/2016 | Sieracki et al. |
| 11,836,945 B2 | 12/2023 | Higashibara |

(Continued)

OTHER PUBLICATIONS

Philion J., et al., "Lift, Splat, Shoot: Encoding Images from Arbitrary Camera Rigs by Implicitly Unprojecting to 3D", arXiv:2008.05711v1 [cs.CV], Aug. 13, 2020, pp. 1-17.

(Continued)

*Primary Examiner* — Xiaolan Xu

(74) *Attorney, Agent, or Firm* — NORTON ROSE FULBRIGHT US LLP

(57) ABSTRACT

This disclosure provides systems, methods, and devices that support machine learning techniques for vehicle guidance. In one aspect, a method is provided that includes receiving an image frame from an image sensor, determining a projected image frame to correct a vertical axis of the image frame, and generating a top-down representation of the environment based on the projected image frame. The projected image frame may be aligned with the top down representation's vertical axis and may be projected using a cylindrical family projection. The top-down representation may be produced by assembling depth and context matrices from vertically aligned pixels in the projected image frame.

26 Claims, 10 Drawing Sheets

Image Frames     Camera Encoder     Camera Features     Transform Process     Top-Down Representation

Related U.S. Application Data

(60) Provisional application No. 63/496,794, filed on Apr. 18, 2023.

(56) References Cited

U.S. PATENT DOCUMENTS

2019/0355171 A1*  11/2019  Ashley .................... G06T 15/04
2022/0135127 A1*   5/2022  Lu .......................... B60R 11/04
                                                          701/41
2024/0354888 A1    10/2024  Nagori

OTHER PUBLICATIONS

International Search Report and Written Opinion PCT/US2025/027907 ISA/EPO Aug. 25, 2025.

Samani E.U., et al., "F2BEV: Bird's Eye View Generation from Surround-View Fisheye Camera Images for Automated Driving", arXiv:2303.03651v1 [cs.CV], Arxiv.Org, Cornell University Library, 201 Olin Library Cornell University Ithaca, NY 14853, Mar. 7, 2023, 8 Pages, XP091454880, abstract Section III. Method, p. 2, left-hand column-p. 4, left-hand column Section V. Experiments, p. 4, left-hand column-p. 7, right-hand column figures 1-4.

Yogamani S., et al., "DaF-BEVSeg: Distortion-Aware Fisheye Camera based Bird's Eye View Segmentation with Occlusion Reasoning", arXiv:2404.06352v1 [cs.CV], Arxiv.Org, Cornell University Library, 201 Olin Library Cornell University Ithaca, NY 14853, Apr. 9, 2024, 8 Pages, XP091723590, abstract Section III. Method, p. 2, left-hand column-p. 4, left-hand column Section IV. Implementation, p. 4, left-hand column-p. 5, left-hand column Section V. Experiments and Results, p. 5, left-hand column-p. 6, right-hand column figures 3-7.

Zhang Q., et al., "Fisheye Image Correction Based on Straight-line Detection and Preservation", 2015 IEEE International Conference on Systems, Man, and Cybernetics, IEEE, Oct. 9, 2015, pp. 1793-1797, XP032847400, The Whole Document.

* cited by examiner

500

RECEIVE TWO OR MORE IMAGE FRAMES FROM TWO OR MORE IMAGE SENSORS ARRANGED TO CAPTURE AN ENVIRONMENT AROUND A VEHICLE
502

DETERMINE CORRESPONDING CELLS FOR LOCATIONS WITHIN THE ENVIRONMENT
504

DETERMINE A TOP-DOWN REPRESENTATION OF THE ENVIRONMENT AROUND THE VEHICLE BY MAPPING VERTICALLY ALIGNED CELLS TO THE SAME LOCATION WITHIN THE TOP-DOWN REPRESENTATION
506

600

700

RECEIVE AN IMAGE FRAME FROM AN IMAGE SENSOR ARRANGED TO CAPTURE AN ENVIRONMENT AROUND A VEHICLE
702

DETERMINE, BASED ON THE IMAGE FRAME, A PROJECTED IMAGE FRAME THAT CORRECTS A VERTICAL AXIS IN THE IMAGE FRAME
704

DETERMINE, BASED ON THE PROJECTED IMAGE FRAME, A TOP-DOWN REPRESENTATION OF THE ENVIRONMENT AROUND THE VEHICLE
706

EFFICIENT BIRDS-EYE VIEW (BEV) GENERATION IN VEHICULAR SYSTEMS

CROSS-REFERENCE TO RELATED APPLICATIONS

This application is a continuation-in-part and claims the benefit of U.S. patent application Ser. No. 18/492,439, entitled, "EFFICIENT BIRDS-EYE GENERATION IN VEHICULAR SYSTEMS," filed Oct. 23, 2023, and also claims the benefit of U.S. Provisional Patent Application No. 63/496,794, entitled, "COLLAPSED VIEW TRANSFORM FOR BIRDS-EYE VIEW (BEV) GENERATION IN VEHICULAR SYSTEMS," filed on Apr. 18, 2023, which is expressly incorporated by reference herein in its entirety.

TECHNICAL FIELD

Aspects of the present disclosure relate generally to driver-operated or driver-assisted vehicles, and more particularly, to methods and systems suitable for supplying driving assistance or for autonomous driving.

INTRODUCTION

Vehicles take many shapes and sizes, are propelled by a variety of propulsion techniques, and carry cargo including humans, animals, or objects. These machines have enabled the movement of cargo across long distances, movement of cargo at high speed, and movement of cargo that is larger than could be moved by human exertion. Vehicles originally were driven by humans to control speed and direction of the cargo to arrive at a destination. Human operation of vehicles has led to many unfortunate incidents resulting from the collision of vehicle with vehicle, vehicle with object, vehicle with human, or vehicle with animal. As research into vehicle automation has progressed, a variety of driving assistance systems have been produced and introduced. These include navigation directions by GPS, adaptive cruise control, lane change assistance, collision avoidance systems, night vision, parking assistance, and blind spot detection.

Advanced driver assistance and autonomous driving systems generate an accurate representation of the environment around the vehicle in a birds-eye view (BEV) representation. The environment includes static elements such as road layout and lane structures, and also dynamic elements such as other cars, pedestrians, and other types of road users.

One prior solution for generating BEVs is a Lift, Splat, and Shoot approached described in "Lift, Splat, Shoot: Encoding Images From Arbitrary Camera Rigs by Implicitly Unprojecting to 3D" by Jonah Philion and Sanja Fidler published in arXiv: 2008.05711, which is hereby incorporated by reference herein. The process includes performing dense pixel-wise depth estimation for the view transformation. First, per-camera backbone networks (convolutional neural networks (CNNs) or Vision Transformers based) are used to perform probabilistic pixel-wise depth prediction to lift each perspective image into a 3D point cloud. Then, camera extrinsics are used to splat the 3D point cloud on a BEV. Finally, a BEV CNN is used to refine the predictions. The first process involves generating dense depth distributions, which result in a large expansion of layer output volume. For example, a total cell volume for a projection is proportional to the number of cameras capturing a scene, the image width, the image height, a depth-category feature vector length D, and a feature-vector length C. Example values for D and C may be 118 and 80, which for 0.18 MP cameras results in a layer output volume storage of 160 MB. When the camera resolution is increased to 2 MP, the equivalent layer output volume storage is 1.6 GB, which is a significant load on computing resources for real-time processing.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Human operators of vehicles can be distracted, which is one factor in many vehicle crashes. Driver distractions can include changing the radio, observing an event outside the vehicle, and using an electronic device, etc. Sometimes circumstances create situations that even attentive drivers are unable to identify in time to prevent vehicular collisions. Aspects of this disclosure provide improved systems for assisting drivers in vehicles with enhanced situational awareness when driving on a road. Additional aspects of this disclosure provide systems for autonomous driving for operating vehicles based on sensor input (e.g., cameras, LiDAR, RADAR, and others).

Processing images captured from environments surrounding vehicles to determine the locations of objects and obstacles within the environments can be computationally intensive. In particular, existing transform processes may rely on intensive processing techniques and complex geometries (such as projecting images to a top-down view). Aspects of this disclosure provide improved systems for performing this processing in a more computationally efficient manner, improving processing times and enabling the use of higher resolution images, thereby improving accuracy.

One aspect provides a method comprising receiving an image frame from an image sensor arranged to capture an environment around a vehicle; determining, based on the image frame, a projected image frame that corrects a vertical axis in the image frame; and determining, based on the projected image frame, a top-down representation of the environment around the vehicle.

Another aspect provides an apparatus comprising a memory storing processor-readable code; and at least one processor coupled to the memory, the at least one processor being configured to execute the processor-readable code to cause the at least one processor to perform operations including receiving an image frame from an image sensor arranged to capture an environment around a vehicle; determining, based on the image frame, a projected image frame that corrects a vertical axis in the image frame; and determining, based on the projected image frame, a top-down representation of the environment around the vehicle.

A further aspect provides a vehicle comprising an image capture device; a memory storing processor-readable code; and at least one processor coupled to the memory and the image capture device, the at least one processor being configured to execute the processor-readable code to cause the at least one processor to perform operations including receiving an image frame from the image capture device; determining, based on the image frame, a projected image frame that corrects a vertical axis in the image frame; and determining, based on the projected image frame, a top-down representation of an environment around the vehicle.

An additional aspect includes a non-transitory computer-readable medium storing instructions that, when executed by a processor, cause the processor to perform operations including receiving an image frame from an image sensor arranged to capture an environment around a vehicle; determining, based on the image frame, a projected image frame that corrects a vertical axis in the image frame; and determining, based on the projected image frame, a top-down representation of the environment around the vehicle.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur.

Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination.

Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

Also, as used herein, the term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

Also, as used herein, relative terms, unless otherwise specified, may be understood to be relative to a reference by a certain amount. For example, terms such as "higher" or "lower" or "more" or "less" may be understood as higher, lower, more, or less than a reference value by a threshold amount.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
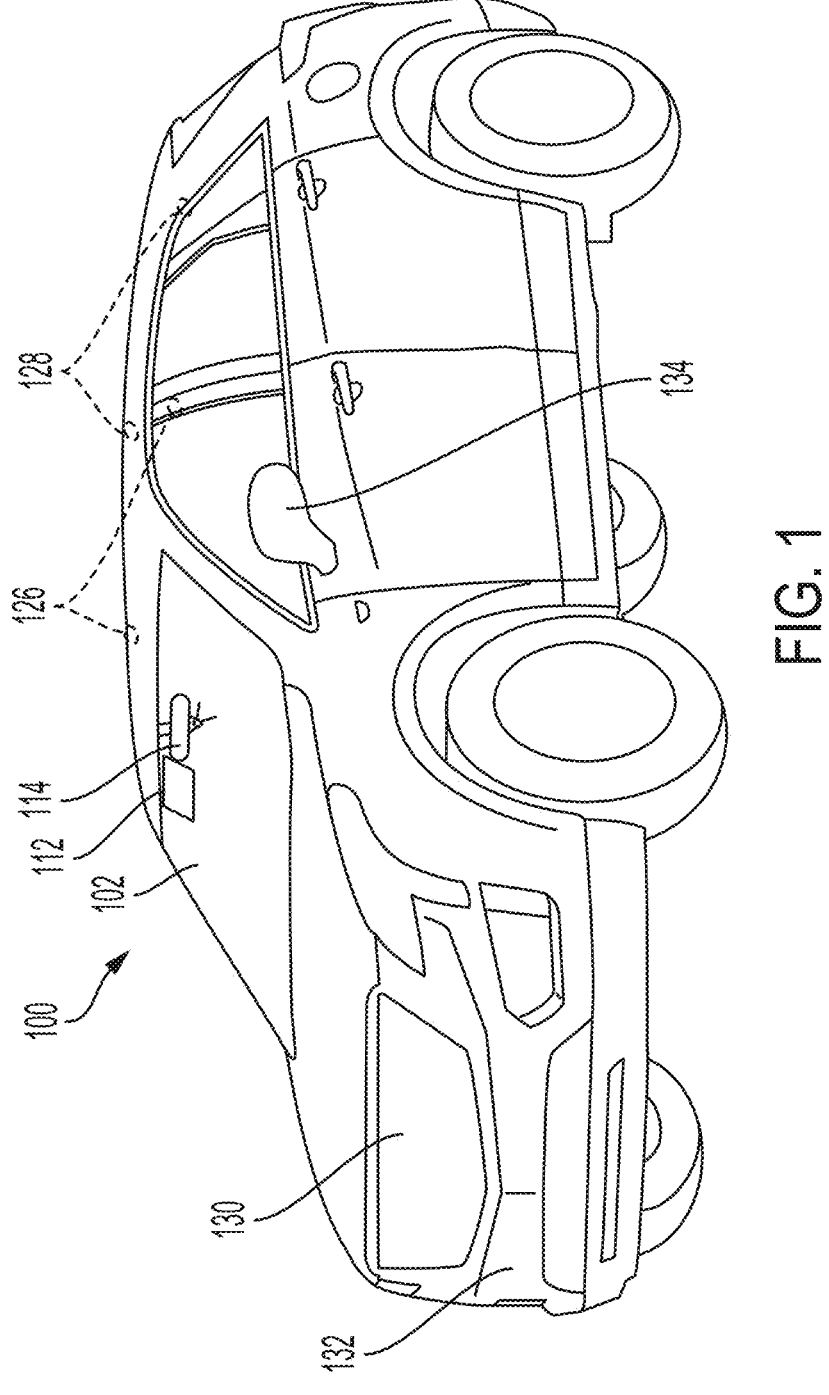
FIG. 1 is a perspective view of a motor vehicle with a driver monitoring system according to embodiments of this disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Existing vehicle sensing systems may typically utilize one of two main approaches for processing multiple camera inputs: decentralized and centralized. The decentralized approach may process images and information from each camera independently, while the centralized approach may combine images and information from multiple cameras for a comprehensive view. The centralized approach has shown superior performance and typically involves three steps: low-level processing of each camera, merging information into a single top-down view, and further processing in the top-down view.

However, transforming camera images into the top-down view can involve complex geometric relationships between objects and features in captured images and their corresponding positions within the top-down view. Existing techniques often warp images into a rectilinear model to simplify this transformation, but rectilinear models may be less accurate or incompatible with wide fields of view (FOVs) (such as FOVs exceeding 160 degrees). Using raw images directly retains the complexity of the 2D-to-3D correspondence, leading to computational challenges.

One solution to this problem is to use an alternative image warping technique, specifically projections that maintain vertical orientations of depicted objects, such as the cylindrical family of projections. Such projections may simplify the 2D-to-3D correspondence while accommodating a wide FOV. For instance, an equirectangular projection may align image positions with world angles, simplifying the mapping process. Additionally, such projections may allow alignment correction for camera mounts across different vehicle models, thus facilitating data reuse and consistent representation.

By employing cylindrical projections, the described techniques ensure that each column of data corresponds to a specific vertical plane in the 3D world. This means that each line in the top view representation depends only on the information from its corresponding image column, reducing memory usage and enabling real-time processing capabilities on in-vehicle hardware.

In some aspects, the present disclosure provides techniques for using cylindrical projections in BEV transforms that may be particularly beneficial in vehicle sensing systems. For example, these projections may simplify the 2D-to-3D mapping, reducing computational complexity and memory usage. The translational invariance property of cylindrical projections also ensures consistent object appearance across the field of view, improving detection accuracy. Furthermore, vertical alignment of projected images with a vertical axis of a vehicle facilitates consistency between images captured by different types of vehicles and for different types of sensor arrangements. This can allow the same model to be deployed across multiple vehicles and sensor arrangements, which reduces the computing resources required to train and deploy perception models across a fleet of different vehicles. Additionally, similar techniques may be used in connection with sensors other than image sensors (such as position sensors). In such instances, similar benefits may be achieved with other types of sensors.

The described techniques enhance the performance of driving assistance and automation systems by providing more accurate and timely information about the vehicle's surroundings. Additionally, simplified processing chains allow for the deployment of advanced BEV architectures in real-time on in-vehicle systems, potentially leading to safer driving experiences. For the overall vehicle sensing systems, these techniques could streamline calibration processes and facilitate quicker adaptation to different vehicle models and camera mounts.

Furthermore, various types of transform processes, such as Lift and Splat (LS) processes may be used to determine top view (such as Bird's Eye View (BEV)) features from images captured of an environment surrounding a vehicle. In certain implementations, the Lift and Splat process may be implemented as part of a broader Lift, Splat, Shoot (LSS) process. Such processes may typically be used to create a dense depth distribution from feature vectors for captured images. In particular, as explained further below, mapping between features within image frames and corresponding top-view features may require that outer products are separately calculated for each ray within an image, which can result in significant computational complexity. Increasing resolution of captured images, which may be desirable to improve the accuracy and quality of detected features within the images, may then typically result in a large increase in the amount of output data, making the processing not feasible. In applications like autonomous driving which require high resolution, this can result in vast amounts of data and computation, which put a substantial strain on system resources. The computational demand and data movement operations may be directly related to the total volume of data, creating an immense volume of data that is difficult for embedded devices to manage or execute in real time. This poses significant challenges for latency-sensitive applications such as autonomous driving.

One solution to this problem is to determine vertically-aligned cells within detected features that can then be mapped directly to the same location within a top-down representation. Doing so may significantly reduce the computational complexity, such as by replacing multiple individual outer product computations with a single matrix multiplication step for vertical columns of features. To do so, a computing device may be configured to receive multiple image frames and determine corresponding cells based on predicted depth information related to pixels within the frames. Each cell may be associated with specific locations within the environment and may correspond to at least one pixel in the image frames. The computing device may also create a top-down representation of the environment by mapping vertically aligned cells to identical locations within this representation. In certain instances, pixels and feature vectors may be processed according to a vertical scanning order, rather than a raster scanning order, to identify vertically-aligned cells with similar depth information when determining the top-down view. In certain instances, the top-down features may be calculated by determining a combined depth matrix by merging individual depth vectors for vertically aligned pixels and computes a combined context matrix by joining individual context vectors. These matrices may then be multiplied to determine part of the top-down representation. Before determining corresponding cells, rotation transforms may be applied to correct for off-axis rotation of any rotated image sensors.

Particular implementations of the subject matter described in this disclosure may be implemented to realize one or more of the following potential advantages or benefits. In some aspects, the present disclosure provides techniques for image processing that may be particularly beneficial in smart vehicle applications. For example, the processing techniques described herein reduce computational complexity resulting in a reduction in processing time for processing images and generating a top-down representation of the environment around the vehicle. The disclosed techniques offer substantial improvements in processing images captured from vehicle surroundings, allowing for efficient object and obstacle location determination within these environments. Through direct computation of the top-down representation, facilitated by matrix multiplication of the combined depth matrix and combined context matrix, these techniques eliminate the need for separately computing outer products that are then summed. These techniques accordingly significantly reduce computational intensity, enabling quicker processing times and usage of high-resolution images thereby enhancing accuracy. Additionally, these techniques also correct camera rotation to ensure vertical processing of cells yield accurately projected features.

By reducing processing times and enabling the use of higher-resolution source images, these techniques may also improve object tracking for vehicle control systems. One major benefit of improved object tracking is that it allows vehicle control systems to more accurately navigate vehicles around obstacles. This can be particularly useful in situations where there may be unexpected obstructions or road conditions that could pose a hazard to drivers. Additionally, improved tracking can help to improve overall safety on the roads by reducing vehicle collisions. With better tracking capabilities, vehicles can be made more responsive to nearby obstacles and can be routed around detected obstacles more efficiently. These improvements can also extend to driver assistance systems, which can benefit from increased monitoring capabilities. By expanding the number, type, and variety of surrounding vehicles that can be detected, these systems can offer more accurate alerts and assistance to drivers when necessary, without generating unnecessary notifications or distractions.

In implementations where projected image frames are determined using a projection that maintains the vertical orientation of depicted objects, determining vertically-aligned cells may be simplified. For example, such projections may be aligned orthogonally with the top-view representation, vertically aligned cells can be identified without reducing perception performance (e.g., because each column of cells corresponds to a vertical column in 3-D space and is accordingly vertically aligned). Such projections may accordingly enable these techniques for determining the top-down representation to be used without a deterioration in perception performance. For example, these adjustments may ensure that the distance metrics used in the transform accurately reflect the real-world distances post-projection, thereby maintaining high fidelity in the transformed view and avoiding performance losses associated with non-cylindrical projections. This method not only boosts processing efficiency but also enhances the adaptability and accuracy of vehicle sensing systems in real-time operations.

FIG. 1 is a perspective view of a motor vehicle with a driver monitoring system according to embodiments of this disclosure. A vehicle 100 may include a front-facing camera 112 mounted inside the cabin looking through the windshield 102. The vehicle may also include a cabin-facing camera 114 mounted inside the cabin looking towards occupants of the vehicle 100, and in particular the driver of the vehicle 100. Although one set of mounting positions for cameras 112 and 114 are shown for vehicle 100, other mounting locations may be used for the cameras 112 and 114. For example, one or more cameras may be mounted on one of the driver or passenger B pillars 126 or one of the driver or passenger C pillars 128, such as near the top of the pillars 126 or 128. As another example, one or more cameras may be mounted at the front of vehicle 100, such as behind the radiator grill 130 or integrated with bumper 132. As a further example, one or more cameras may be mounted as part of a driver or passenger side mirror assembly 134.

The camera 112 may be oriented such that the field of view of camera 112 captures a scene in front of the vehicle 100 in the direction that the vehicle 100 is moving when in drive mode or forward direction. In some embodiments, an additional camera may be located at the rear of the vehicle 100 and oriented such that the field of view of the additional camera captures a scene behind the vehicle 100 in the direction that the vehicle 100 is moving when in reverse direction. Although embodiments of the disclosure may be described with reference to a "front-facing" camera, referring to camera 112, aspects of the disclosure may be applied similarly to a "rear-facing" camera facing in the reverse direction of the vehicle 100. Thus, the benefits obtained while the operator is driving the vehicle 100 in a forward direction may likewise be obtained while the operator is driving the vehicle 100 in a reverse direction.

Further, although embodiments of the disclosure may be described with reference a "front-facing" camera, referring to camera 112, aspects of the disclosure may be applied similarly to an input received from an array of cameras mounted around the vehicle 100 to provide a larger field of view, which may be as large as 360 degrees around parallel to the ground and/or as large as 360 degrees around a vertical direction perpendicular to the ground. For example, additional cameras may be mounted around the outside of vehicle 100, such as on or integrated in the doors, on or integrated in the wheels, on or integrated in the bumpers, on or integrated in the hood, and/or on or integrated in the roof.

The camera 114 may be oriented such that the field of view of camera 114 captures a scene in the cabin of the vehicle and includes the user operator of the vehicle, and in particular the face of the user operator of the vehicle with sufficient detail to discern a gaze direction of the user operator.

Each of the cameras 112 and 114 may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a telephoto image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur in a camera module with a lens cluster, in which the multiple image sensors and associated lenses are located in offset locations within the camera module. Additional image sensors may be included with larger, smaller, or same fields of view.

Each image sensor may include means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), and/or time of flight detectors. The apparatus may further include one or more means for accumulating and/or focusing light rays into the one or more image sensors (including simple lenses, compound lenses, spherical lenses, and non-spherical lenses). These components may be controlled to capture the first, second, and/or more image frames. The image frames may be processed to form a single output image frame, such as through a fusion operation, and that output image frame further processed according to the aspects described herein.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

Figure 2:
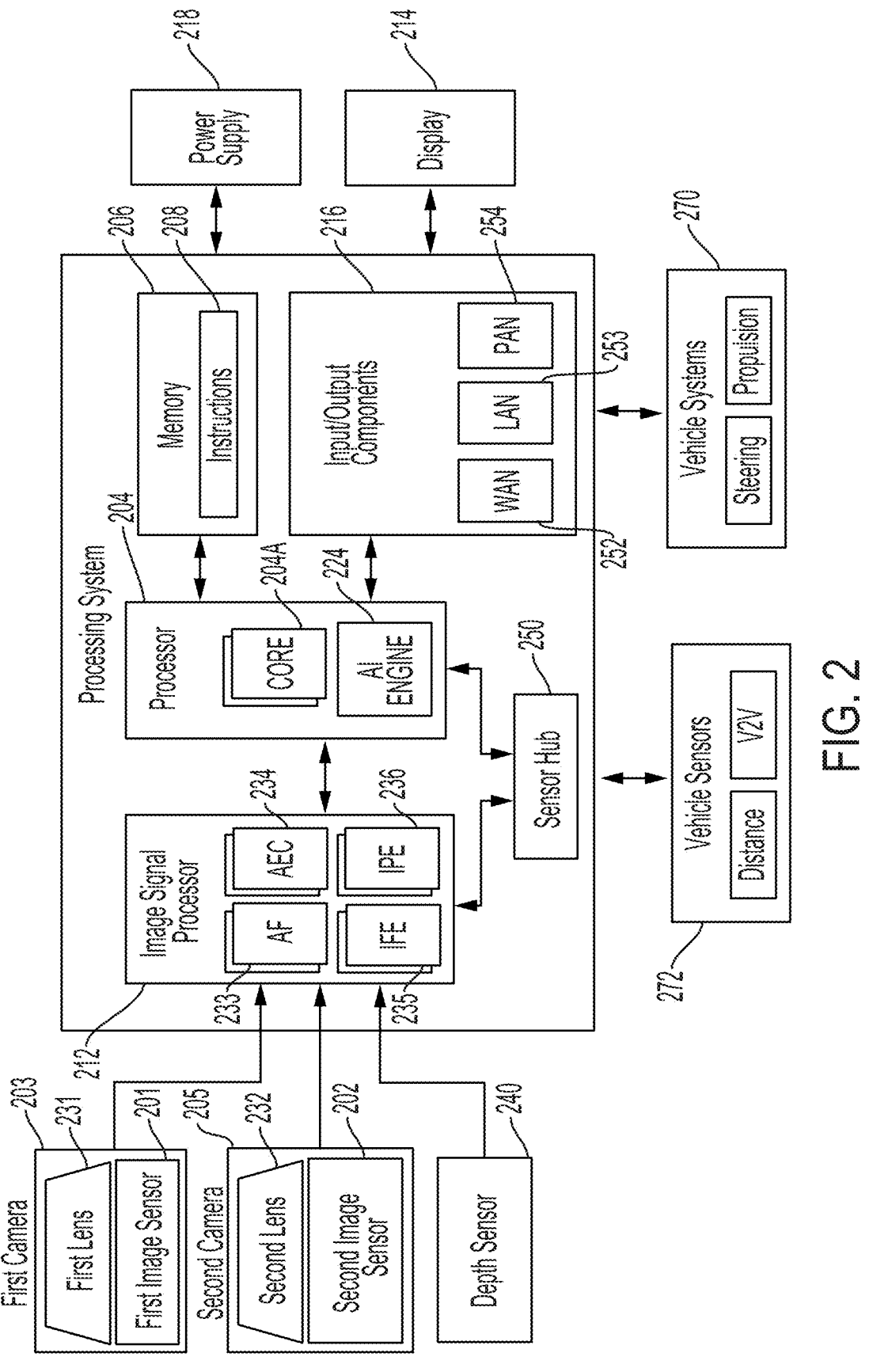
FIG. 2 shows a block diagram of an example image processing configuration for a vehicle according to one or more aspects of the disclosure.

FIG. 2 shows a block diagram of an example image processing configuration for a vehicle according to one or more aspects of the disclosure. The vehicle 100 may include, or otherwise be coupled to, an image signal processor 212 for processing image frames from one or more image sensors, such as a first image sensor 201, a second image sensor 202, and a depth sensor 240. In some implementations, the vehicle 100 also includes or is coupled to a processor (e.g., CPU) 204 and a memory 206 storing instructions 208. The device 100 may also include or be coupled to a display 214 and input/output (I/O) components 216. I/O components 216 may be used for interacting with a user, such as a touch screen interface and/or physical buttons. I/O components 216 may also include network interfaces for communicating with other devices, such as other vehicles, an operator's mobile devices, and/or a remote monitoring system. The network interfaces may include one or more of a wide area network (WAN) adaptor 252, a local area network (LAN) adaptor 253, and/or a personal area network (PAN) adaptor 254. An example WAN adaptor 252 is a 4G LTE or a 5G NR wireless network adaptor. An example LAN adaptor 253 is an IEEE 802.11 WiFi wireless network adapter. An example PAN adaptor 254 is a Bluetooth wireless network adaptor. Each of the adaptors 252, 253, and/or 254 may be coupled to an antenna, including multiple antennas configured for primary and diversity reception and/or configured for receiving specific frequency bands. The vehicle 100 may further include or be coupled to a power supply 218, such as a battery or an alternator. The vehicle 100 may also include or be coupled to additional features or components that are not shown in FIG. 2. In one example, a wireless interface, which may include one or more transceivers and associated baseband processors, may be coupled to or included in WAN adaptor 252 for a wireless communication device. In a further example, an analog front end (AFE) to convert analog image frame data to digital image frame data may be coupled between the image sensors 201 and 202 and the image signal processor 212.

The vehicle 100 may include a sensor hub 250 for interfacing with sensors to receive data regarding movement of the vehicle 100, data regarding an environment around the vehicle 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In further examples, a non-camera sensor may be a global positioning system (GPS) receiver, a light detection and ranging (LiDAR) system, a radio detection and ranging (RADAR) system, or other ranging systems. For example, the sensor hub 250 may interface to a vehicle bus for sending configuration commands and/or receiving information from vehicle sensors 272, such as distance (e.g., ranging) sensors or vehicle-to-vehicle (V2V) sensors (e.g., sensors for receiving information from nearby vehicles).

The image signal processor (ISP) 212 may receive image data, such as used to form image frames. In one embodiment, a local bus connection couples the image signal processor 212 to image sensors 201 and 202 of a first camera 203, which may correspond to camera 112 of FIG. 1, and second camera 205, which may correspond to camera 114 of FIG. 1, respectively. In another embodiment, a wire interface may couple the image signal processor 212 to an external image sensor. In a further embodiment, a wireless interface may couple the image signal processor 212 to the image sensor 201, 202.

The first camera 203 may include the first image sensor 201 and a corresponding first lens 231. The second camera 205 may include the second image sensor 202 and a corresponding second lens 232. Each of the lenses 231 and 232 may be controlled by an associated autofocus (AF) algorithm 233 executing in the ISP 212, which adjust the lenses 231 and 232 to focus on a particular focal plane at a certain scene depth from the image sensors 201 and 202. The AF algorithm 233 may be assisted by depth sensor 240. In some embodiments, the lenses 231 and 232 may have a fixed focus.

The first image sensor 201 and the second image sensor 202 are configured to capture one or more image frames. Lenses 231 and 232 focus light at the image sensors 201 and 202, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging.

In some embodiments, the image signal processor 212 may execute instructions from a memory, such as instructions 208 from the memory 206, instructions stored in a separate memory coupled to or included in the image signal processor 212, or instructions provided by the processor 204. In addition, or in the alternative, the image signal processor 212 may include specific hardware (such as one or more integrated circuits (ICs)) configured to perform one or more operations described in the present disclosure. For example, the image signal processor 212 may include one or more image front ends (IFEs) 235, one or more image post-processing engines (IPEs) 236, and or one or more auto exposure compensation (AEC) 234 engines. The AF 233, AEC 234, IFE 235, IPE 236 may each include application-specific circuitry, be embodied as software code executed by the ISP 212, and/or a combination of hardware within and software code executing on the ISP 212.

In some implementations, the memory 206 may include a non-transient or non-transitory computer readable medium storing computer-executable instructions 208 to perform all or a portion of one or more operations described in this disclosure. In some implementations, the instructions 208 include a camera application (or other suitable application) to be executed during operation of the vehicle 100 for generating images or videos. The instructions 208 may also include other applications or programs executed for the vehicle 100, such as an operating system, mapping applications, or entertainment applications. Execution of the camera application, such as by the processor 204, may cause the vehicle 100 to generate images using the image sensors 201 and 202 and the image signal processor 212. The memory 206 may also be accessed by the image signal processor 212 to store processed frames or may be accessed by the processor 204 to obtain the processed frames. In some embodiments, the vehicle 100 includes a system on chip (SoC) that incorporates the image signal processor 212, the processor 204, the sensor hub 250, the memory 206, and input/output components 216 into a single package.

In some embodiments, at least one of the image signal processor 212 or the processor 204 executes instructions to perform various operations described herein, including object detection, risk map generation, driver monitoring, and driver alert operations. For example, execution of the instructions can instruct the image signal processor 212 to begin or end capturing an image frame or a sequence of image frames. In some embodiments, the processor 204 may include one or more general-purpose processor cores 204A capable of executing scripts or instructions of one or more software programs, such as instructions 208 stored within the memory 206. For example, the processor 204 may include one or more application processors configured to execute the camera application (or other suitable application for generating images or video) stored in the memory 206.

In executing the camera application, the processor 204 may be configured to instruct the image signal processor 212 to perform one or more operations with reference to the image sensors 201 or 202. For example, the camera application may receive a command to begin a video preview display upon which a video comprising a sequence of image frames is captured and processed from one or more image sensors 201 or 202 and displayed on an informational display on display 114 in the cabin of the vehicle 100.

In some embodiments, the processor 204 may include ICs or other hardware (e.g., an artificial intelligence (AI) engine 224) in addition to the ability to execute software to cause the vehicle 100 to perform a number of functions or operations, such as the operations described herein. In some other embodiments, the vehicle 100 does not include the processor 204, such as when all of the described functionality is configured in the image signal processor 212.

In some embodiments, the display 214 may include one or more suitable displays or screens allowing for user interaction and/or to present items to the user, such as a preview of the image frames being captured by the image sensors 201 and 202. In some embodiments, the display 214 is a touch-sensitive display. The I/O components 216 may be or include any suitable mechanism, interface, or device to receive input (such as commands) from the user and to provide output to the user through the display 214. For example, the I/O components 216 may include (but are not limited to) a graphical user interface (GUI), a keyboard, a mouse, a microphone, speakers, a squeezable bezel, one or more buttons (such as a power button), a slider, a switch, and so on. In some embodiments involving autonomous driving, the I/O components 216 may include an interface to a vehicle's bus for providing commands and information to and receiving information from vehicle systems 270 including propulsion (e.g., commands to increase or decrease speed or apply brakes) and steering systems (e.g., commands to turn wheels, change a route, or change a final destination).

While shown to be coupled to each other via the processor 204, components (such as the processor 204, the memory 206, the image signal processor 212, the display 214, and the I/O components 216) may be coupled to each another in other various arrangements, such as via one or more local buses, which are not shown for simplicity. While the image signal processor 212 is illustrated as separate from the processor 204, the image signal processor 212 may be a core of a processor 204 that is an application processor unit (APU), included in a system on chip (SoC), or otherwise included with the processor 204. While the vehicle 100 is referred to in the examples herein for including aspects of the present disclosure, some device components may not be shown in FIG. 2 to prevent obscuring aspects of the present disclosure. Additionally, other components, numbers of components, or combinations of components may be included in a suitable vehicle for performing aspects of the present disclosure. As such, the present disclosure is not limited to a specific device or configuration of components, including the vehicle 100.

Figure 3:
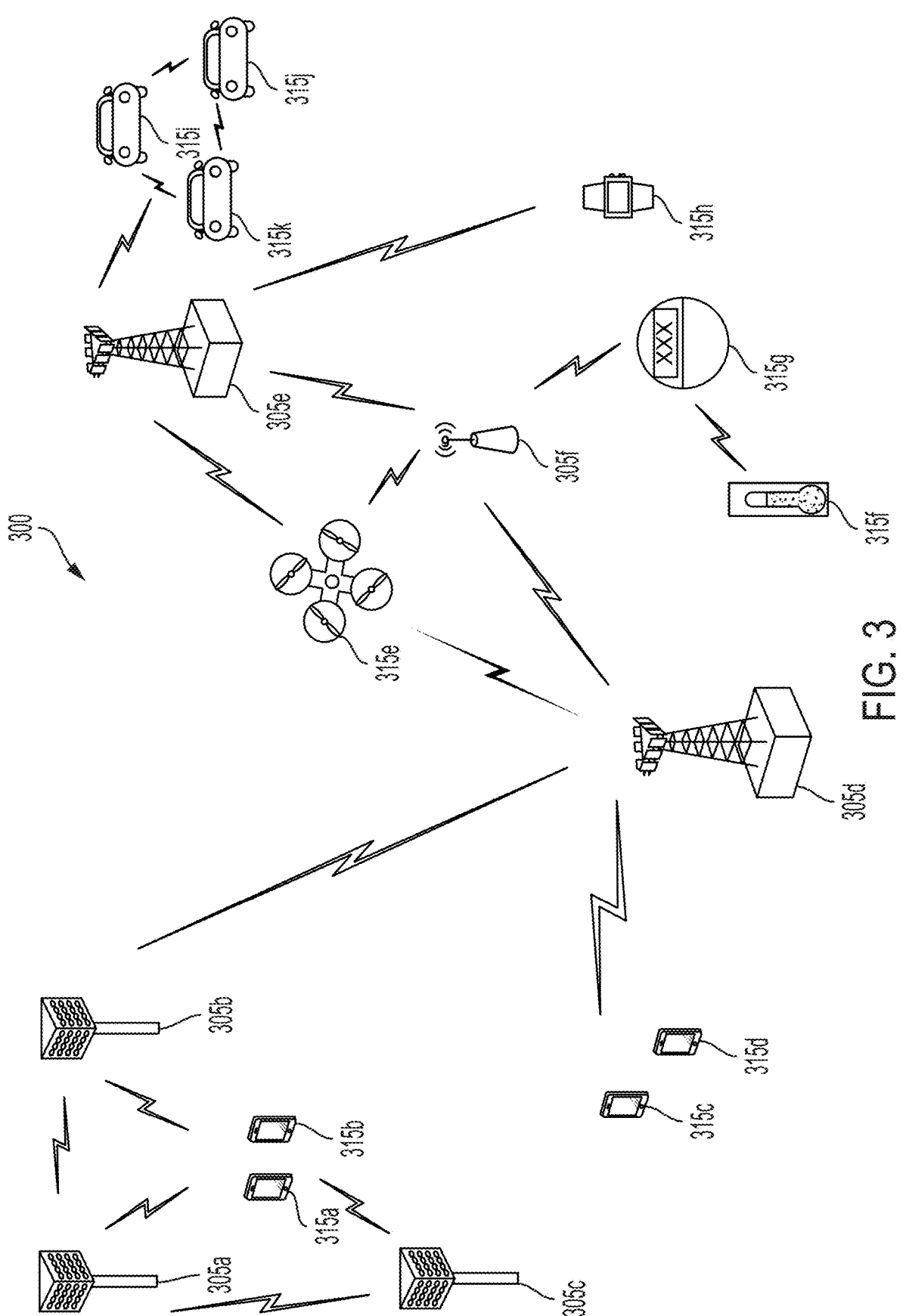
FIG. 3 is a block diagram illustrating details of an example wireless communication system according to one or more aspects.

The vehicle 100 may communicate as a user equipment (UE) within a wireless network 300, such as through WAN adaptor 252, as shown in FIG. 3. FIG. 3 is a block diagram illustrating details of an example wireless communication system according to one or more aspects. Wireless network 300 may, for example, include a 5G wireless network. As appreciated by those skilled in the art, components appearing in FIG. 3 are likely to have related counterparts in other network arrangements including, for example, cellular-style network arrangements and non-cellular-style-network arrangements (e.g., device-to-device or peer-to-peer or ad-hoc network arrangements, etc.).

Wireless network 300 illustrated in FIG. 3 includes base stations 305 and other network entities. A base station may be a station that communicates with the UEs and may also be referred to as an evolved node B (eNB), a next generation eNB (gNB), an access point, and the like. Each base station 305 may provide communication coverage for a particular geographic area. In 3GPP, the term "cell" may refer to this particular geographic coverage area of a base station or a base station subsystem serving the coverage area, depending on the context in which the term is used. In implementations of wireless network 300 herein, base stations 305 may be associated with a same operator or different operators (e.g., wireless network 300 may include a plurality of operator wireless networks). Additionally, in implementations of wireless network 300 herein, base station 305 may provide wireless communications using one or more of the same frequencies (e.g., one or more frequency bands in licensed spectrum, unlicensed spectrum, or a combination thereof) as a neighboring cell. In some examples, an individual base station 305 or UE 315 may be operated by more than one network operating entity. In some other examples, each base station 305 and UE 315 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 3, base stations 305*d* and 305*e* are regular macro base stations, while base stations 305*a*-305*c* are macro base stations enabled with one of three-dimension (3D), full dimension (FD), or massive MIMO. Base stations 305*a*-305*c* take advantage of their higher dimension MIMO capabilities to exploit 3D beamforming in both elevation and azimuth beamforming to increase coverage and capacity. Base station 305*f* is a small cell base station which may be a home node or portable access point. A base station may support one or multiple (e.g., two, three, four, and the like) cells.

Wireless network 300 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 315 are dispersed throughout the wireless network 300, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology.

Some non-limiting examples of a mobile apparatus, such as may include implementations of one or more of UEs 315, include a mobile, a cellular (cell) phone, a smart phone, a session initiation protocol (SIP) phone, a wireless local loop (WLL) station, a laptop, a personal computer (PC), a notebook, a netbook, a smart book, a tablet, a personal digital assistant (PDA), and a vehicle. Although UEs 315*a-j* are specifically shown as vehicles, a vehicle may employ the communication configuration described with reference to any of the UEs 315*a*-315*k*.

In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 315a-315d of the implementation illustrated in FIG. 3 are examples of mobile smart phone-type devices accessing wireless network 300. A UE may also be a machine specifically configured for connected communication, including machine type communication (MTC), enhanced MTC (eMTC), narrowband IoT (NB-IoT) and the like. UEs 315c-315k illustrated in FIG. 3 are examples of various machines configured for communication that access wireless network 300.

A mobile apparatus, such as UEs 315, may be able to communicate with any type of the base stations, whether macro base stations, pico base stations, femto base stations, relays, and the like. In FIG. 3, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 300 may occur using wired or wireless communication links.

In operation at wireless network 300, base stations 305a-305c serve UEs 315a and 315b using 3D beamforming and coordinated spatial techniques, such as coordinated multi-point (CoMP) or multi-connectivity. Macro base station 305d performs backhaul communications with base stations 305a-305c, as well as small cell, base station 305f. Macro base station 305d also transmits multicast services which are subscribed to and received by UEs 315c and 315d. Such multicast services may include mobile television or stream video, or may include other services for providing community information, such as weather emergencies or alerts, such as Amber alerts or gray alerts.

Wireless network 300 of implementations supports communications with ultra-reliable and redundant links, such as UE 315e, which is a remote-controlled aerial vehicle. Redundant communication links with UE 315e include from macro base stations 305d and 305c, as well as small cell base station 305f. Other machine type devices, such as UE 315f (thermometer), UE 315g (smart meter), and UE 315h (wearable device) may communicate through wireless network 300 either directly with base stations, such as small cell base station 305f, and macro base station 305c, or in multi-hop configurations by communicating with another user device which relays its information to the network, such as UE 315f communicating temperature measurement information to the smart meter, UE 315g, which is then reported to the network through small cell base station 305f. Wireless network 300 may also provide additional network efficiency through dynamic, low-latency TDD communications or low-latency FDD communications, such as in a vehicle-to-vehicle (V2V) mesh network between UEs 315i-315k communicating with macro base station 305c.

Aspects of the vehicular systems described with reference to, and shown in, FIG. 1, FIG. 2, and FIG. 3 may include image processing systems for generating top-down views as part of image processing operations described with reference to FIGS. 4A-C, FIG. 5, FIGS. 6A-6B, and FIG. 7

Figure 4A:
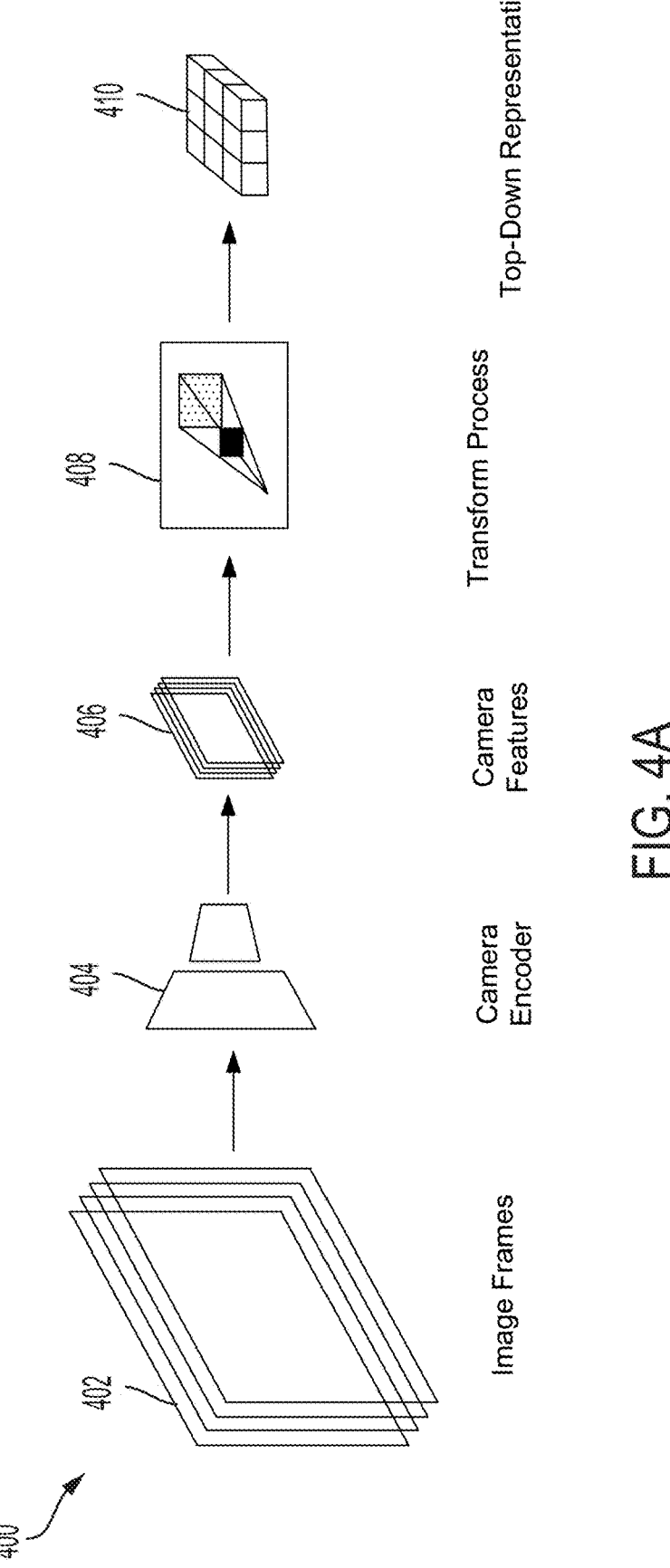
FIG. 4A is a block diagram illustrating a transform process according to some embodiments of the disclosure.

FIG. 4A is a block diagram illustrating a transform process 400 according to some embodiments of the disclosure. A transform process 400 may include capturing an environment around a vehicle with image frames 402, such as from multiple positions or fields of view around a vehicle. The image frames 402 may be input to a camera encoder 404 to extract features. The encoder 404 may be a modality-specific encoder configured for processing image data (such as RGB image data) to determine camera features 406. The camera features 406 may be processed with a transform process 408 that projects the features onto a top-down representation 410 of the environment surrounding the vehicle.

Feature vectors for images may include numerical representations of various aspects of an image frame. Some examples of features include color histograms, texture descriptors, edge detection, and shape analysis. Color histograms may quantify the distribution of colors in an image, while texture descriptors may capture patterns such as roughness or smoothness. Edge detections may identify boundaries between objects in an image, while shape analysis may identify or otherwise distinguish different types of objects based on geometric properties of the object within the image frame. In certain implementations, feature vectors may be single-dimensional, such as an N×1 vector, where N is the number of features. In additional or alternative implementations, feature vectors may be multi-dimensional, such as an N×M×O vector, where at least two of N, M, and O are greater than 1.

Figure 4B:
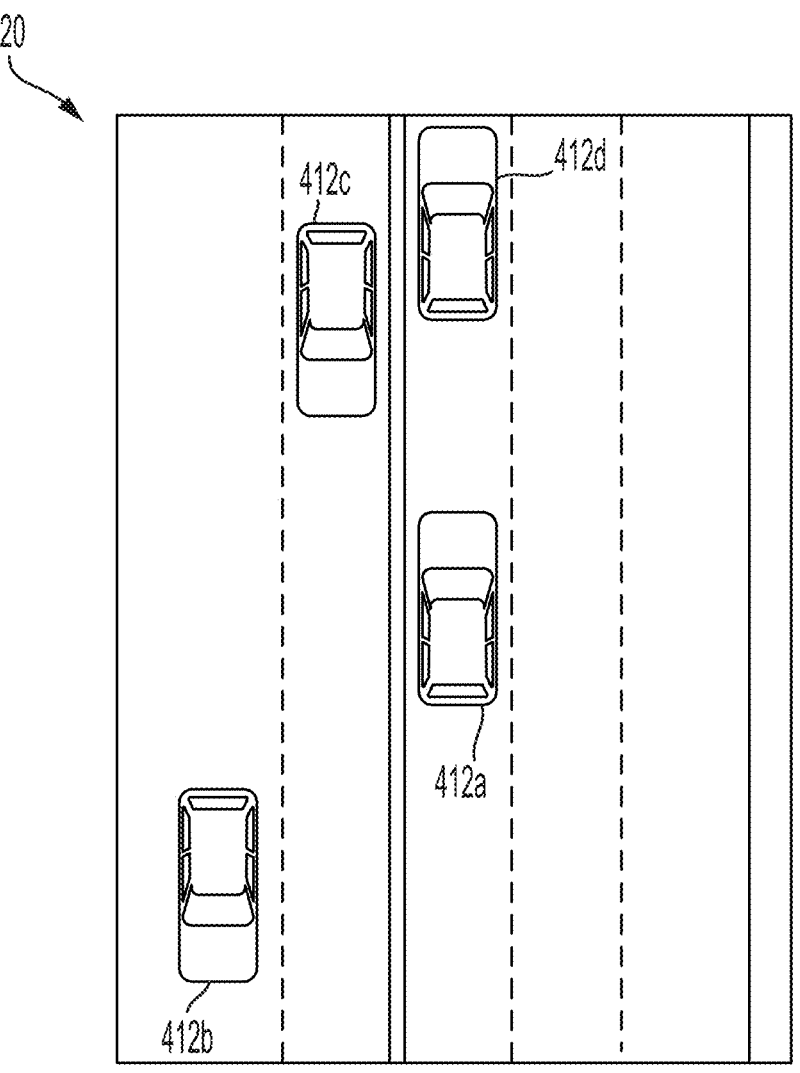
FIG. 4B is an a top-view representation according to some embodiments of this disclosure.

Top-down views may provide top-down (or bird's eye view) representations of vehicles and their surroundings. Top-down views may consist of a grid-based image or other representation (such as a 128-by-128 pixel representation) that depict objects or obstacles located within the vehicle's vicinity (such as within a predetermined range of the vehicle). Top-down views may also include metadata or other indications that identify particular types of objects or obstacles located within each pixel of the grid. In particular, the top-down features may specify locations within top-down views for the corresponding features (such as within a feature vector containing the feature). In certain implementations, the top-down features may individually specify corresponding locations for each feature and feature value. In additional or alternative implementations, the top-down view may include multiple feature vectors, where each feature vector corresponds to a particular location within the top-down representation. FIG. 4B is an example top-down representation 420 of an environment around a vehicle 412a according to one aspect of the present disclosure. The representation 420 may include vehicles 412b-d positioned in the environment of the vehicle 412a as captured by image frames from cameras 112 and 114 of the vehicle 100 shown in FIG. 1.

The transform process 408 may include BEV pooling. The first step of BEV pooling may be to associate each point in the camera feature point cloud with the top-down representation. The next step of BEV pooling is to aggregate the features within each BEV grid by some symmetric function (e.g., mean, max, and sum).

The camera-to-BEV transform may implement one or more geometry-based methods or machine learning-based methods. Example geometry-based methods include Lift and Splat and Categorical Depth Distribution Network (CaDDN), which predict categorical depth distributions for each pixel and "lift" the corresponding features into 3D space according to the predicted depth denoted by a feature vector. The feature vectors are then gathered into pre-defined grids as a "splat" onto a reference BEV plane to form the camera features in the top-down representation 410. The size of the lifted camera features is very large, which creates a bottleneck for real-time processing, on either or both of computational resources or memory bandwidth. An example "lifting" operation involves, for each extracted image camera feature 406, projecting each pixel into 3D space by computing a per-pixel outer product with corresponding depth. The resulting high-dimensional tensor is then collapsed to a BEV reference plane using convolution, pillar pooling, voxel pooling, or another technique.

With the camera features mapped in a top-down representation 410, further processing may be performed to analyze the environment around the vehicle and used as input for assistance or automation systems in the vehicle. For example, the camera features in the top-down representation 410 may be input to object detection, map segmentation, motion planning, or other algorithms. An example output of object detection may identify the location of vehicles in an environment around the vehicle. In certain implementations, the top-down representation may be used when determining vehicle control instructions for the vehicle. In certain implementations, vehicle control instructions may refer to the set of commands and guidelines that directly or indirectly regulate the movement of a vehicle. These instructions may come in the form of direct vehicular control instructions, such as steering, braking, accelerating or combinations thereof. In additional or alternative implementations, vehicle control instructions may be supplementary instructions that support driver assistance programs, such as obstacle avoidance, blind spot monitoring, and other driver assistance alerts. Vehicle control instructions may accordingly help drivers to maintain safe operation of vehicles while driving on roads and highways. Vehicle control instructions may also include the operation of active braking or steering systems and/or adjusting vehicle speed as part of a cruise control system.

Embodiments of this disclosure reduce the computational complexity of the camera-to-BEV transformation by identifying cells within an environment that correspond to the same location (such as a voxel) within a top-down representation (such as a BEV representation). These cells may then be mapped and combined prior to performing top-down projection calculations, which may reduce the overall complexity of the calculations and the computational resources required.

In one such implementation, a computing device may be configured to receive two or more image frames 402. The image frames 402 may be received from two or more image sensors, which may be configured to capture an environment that surrounds a vehicle, such as different or overlapping parts of the environment.

Figure 4C:
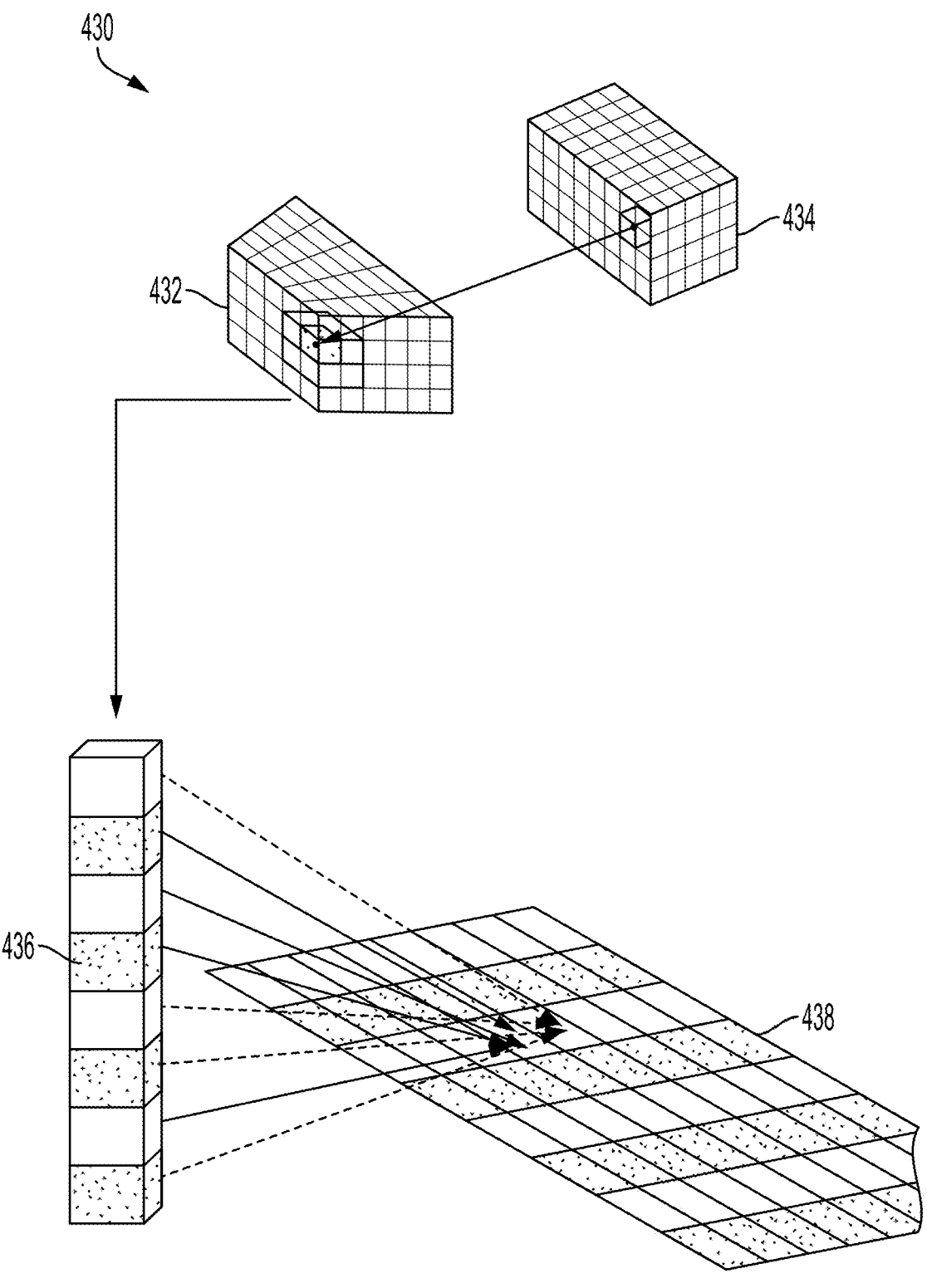
FIG. 4C illustrates an example of the cell mapping into a BEV grid according to some embodiments of the disclosure.

The computing device may also be configured to determine corresponding cells which are associated with specific locations within the environment. In certain implementations, each cell may correspond to at least one pixel within at least one of the image frames 402. The cells may be determined by the computing device based on predicted depth information related to pixels within at least one of the received frames 402. For example, each pixel within the image frames 402 may have corresponding predicted depth information at a predetermined plurality of depths within the environment. As one specific example, FIG. 4C depicts an operation 430 in which cells are determined based on features within image frames. The cells 432 may correspond to portions of voxels within the environment. For example, voxels may be three-dimensional, cubic portions of the environment surrounding the vehicle and the cells 432 may be skewed in shape based on the field of view and imaging geometry of the image sensors. As one specific example, the cells 432 may be shaped like frustums, as shown in FIG. 4C.

Embodiments of this disclosure may also reduce the computational complexity of determining top-down representations by projecting one or more captured image frames such that the mapping between two-dimensional coordinates within the image frames and three-dimensional coordinates within the area surrounding the vehicle is simplified. For example, the computing device may apply a projection to the image frames that maintains or corrects the axis of the image frames. vertical orientation of objects, such as a cylindrical projection. The projection may simplify the mapping process by ensuring each column of pixels corresponds to a specific vertical plane in three-dimensional space.

For example, the image frames 402 may not be the raw image frames captured by image sensors located on the vehicle. In certain implementations, the computing device may be configured to receive one or more image frames from one or more image sensors arranged to capture an environment around the vehicle. In certain such implementations, at least a subset of the one or more image sensors may have a field of view greater than or equal to 160 degrees (such as one or more fisheye cameras).

The computing device may also be configured to determine, based on the received image frames, one or more projected image frames. For example, the image frames 402 may be the projected image frames. In certain implementations, the projected image frames may be determined to correct the vertical axis of the image frames. Correcting the vertical axis in image projections may include adjusting the image to correct for distortions to the orientation of objects, ensuring that elements such as buildings, trees, and other upright objects maintain an upright appearance in the resultant images, irrespective of distortions caused by the perspective, lens, or camera angle. For example, correcting the vertical orientation may include correcting for distortion of objects that are not near the center of the image.

In certain implementations, the projected image frames 402 may be determined according to one or more cylindrical family projections. Cylindrical family projections may include projections in which the images are projected onto a cylindrical or similar surface. In certain implementations, the projections used to determine the projected image frame may be symmetrical around a central axis (such as an axis centered on the vehicle, the image sensor), such that if the projection surface is rotated, the resulting projected images do not change. For example, the projected image frames may be determined based on a full cylindrical projection, an equirectangular projection, a Mercator projection, or a combination thereof. In certain implementations, each column of pixels within the projected image frame may correspond to a respective yaw angle (such as a yaw angle relative to the image sensor, a yaw angle within the top-down representation, a yaw angle relative to a direction of travel for the vehicle). As one specific such example, the projected image frames may be determined using an equirectangular projection.

Figure 6A:
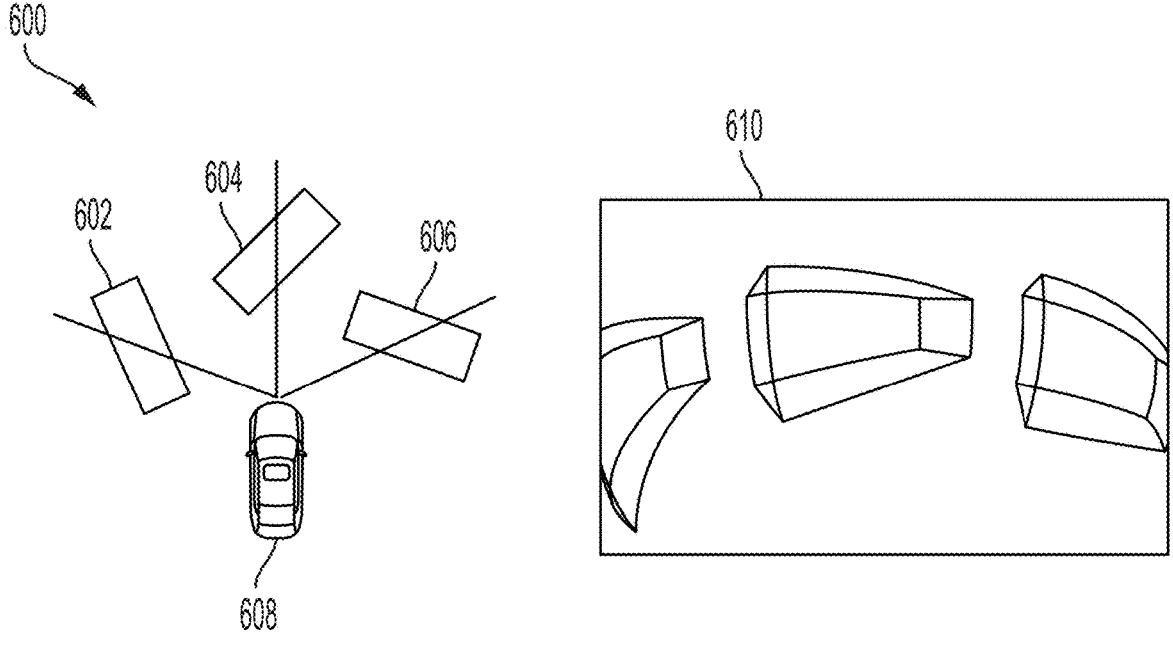
FIG. 6A shows an imaging scenario and image frames according to one aspect of the present disclosure.
Figure 6A:
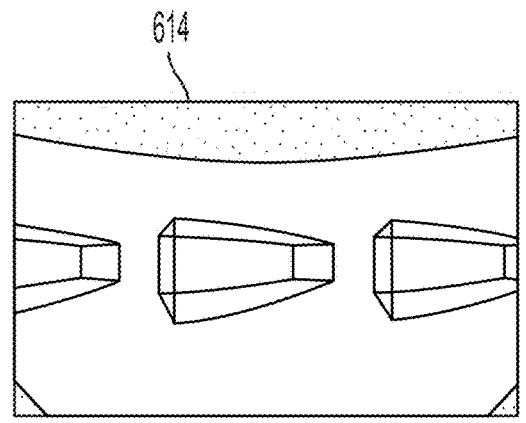
Figure 6A:
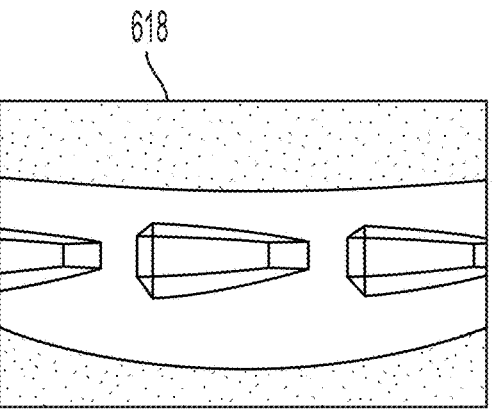

As another example, FIG. 6A depicts an imaging scenario 600 in which a vehicle 608 (which may be an exemplary implementation of the vehicle 100) is approaching three objects 602, 604, 606. A front-facing camera on the vehicle 608 may capture a raw image frame 610 that depicts the 3 objects 602, 604, 606. However, as depicted, the image frame 610 may include distorted representations of the objects 602, 604, 606, which may be caused by a wide field of view for the front facing camera. In particular, objects further to the sides of the image frame 610 show greater distortion than objects closer to the center of the image frame 610. To remedy these distortions, one or more projected image frames may be determined based on the image frame 610. The projected image frames may correct a vertical orientation of objects depicted within the image frames (such as to remove or reduce vertical distortion of objects within the projected image frame. FIG. 6A depicts exemplary projected image frames 614, 618 that use different types of projections. In particular, the projected image frame 614 uses a full cylindrical projection and the projected image frame is 618 uses an equirectangular projection. The computing device may use one or more of these projections when determining the projected image frame 402.

In additional or alternative implementations, the projected image frames 402 may be determined to ensure that the image frames have a proper vertical orientation relative to a vertical axis of the top-down representation (such as a vertical axis extending upwards from a center of the vehicle and perpendicular to the ground). For example, determining projected image frames based on received image frames may include aligning the projected image frames with a vertical axis of the top-down representation. In certain implementations, the received image frames may be aligned with the vertical axis of the top-down representation before determining the projected image frames. In certain implementations, the image frames may be aligned with the vertical axis of the top-down representation while determining the projected image frames (such as when a central axis of the projection surface aligns with the vertical axis of the top-down representation). In certain implementations, the off-axis angle may be indicated by extrinsic parameters for the image sensor (such as an indication of a viewing axis or mounting angle for the image sensor), intrinsic parameters for the image sensor (such as an indication of an FOV for the image sensor), or combinations thereof. Additionally or alternatively, the off-axis rotation may be programmatically determined, such as by analyzing one or more objects within the photo to determine a predicted deviation angle for the image sensor. For example, the off-axis rotation may be determined using visual-inertial odometry techniques, image-based simultaneous localization and mapping, real-time pose estimation techniques, dynamic sensor calibration techniques, or a combination thereof.

In certain implementations, the computing device may also be configured to determine a top-down representation 410 of the surrounding environment. In particular, the computing device may be configured to map vertically aligned cells to an identical location within the top-down representation 410. For example, in the operation 430, a set of vertically aligned cells 436 are identified. The vertically aligned cells 436 may correspond to the same location within a top-down representation 438.

In certain implementations, the computing device may process pixels from the image frames 402 using a vertical scanning order. Such a scanning order may enable the identification of vertically-aligned cells 436 (such as cells from vertically-aligned pixels within an image that have the same or similar depth information) while determining the top-down representation 410, 438. Such implementations may deviate from conventional techniques, which may typically use a raster scanning order (such as a horizontal scanning order).

To determine the top-down representation 410, 438, the computing device may be configured to calculate a combined depth matrix by merging individual depth vectors for vertically aligned pixels within the image frames 402. The computing device may also compute a combined context matrix by joining individual context vectors for vertically aligned pixels within the image frames 402. The computing device may then determine at least a portion of the top-down representation 410, 438 by performing a multiplication operation between the combined depth matrix and the combined context matrix. This process may then be repeated for each vertical column within the images.

In more detail, during a conventional BEV pooling operation, an outer product may need to be computed for every ray within the images. In particular, for each ray (e.g., each pixel) within an image, an outer product may need to be computed between a depth vector for the ray and a context vector for the ray. In one example, the depth vector may have a size of $D=118$ and the context vector may have a size of $C=80$. Furthermore, the vectors may have a vertical spatial resolution of 32, meaning there are 32 separate sets of depth and context vectors for each vertical column within the images.

In such instances, a context vector may be provided as shown below:

| $c1$ | $c2$ | $\ldots$ | $\ldots$ | $c80$ |
|------|------|----------|----------|-------|

The context vector may identify features and/or feature values ($c1$-$c80$) for the corresponding ray or pixel within the image frame.

In such instances, the depth vector may be provided as shown below:

| |
|---|
| $d1$ |
| $d2$ |
| $\ldots$ |
| $\ldots$ |
| $d118$ |

Figure 6B:
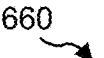
FIG. 6B shows distances measurements according to one aspect of the present disclosure.
Figure 6B:
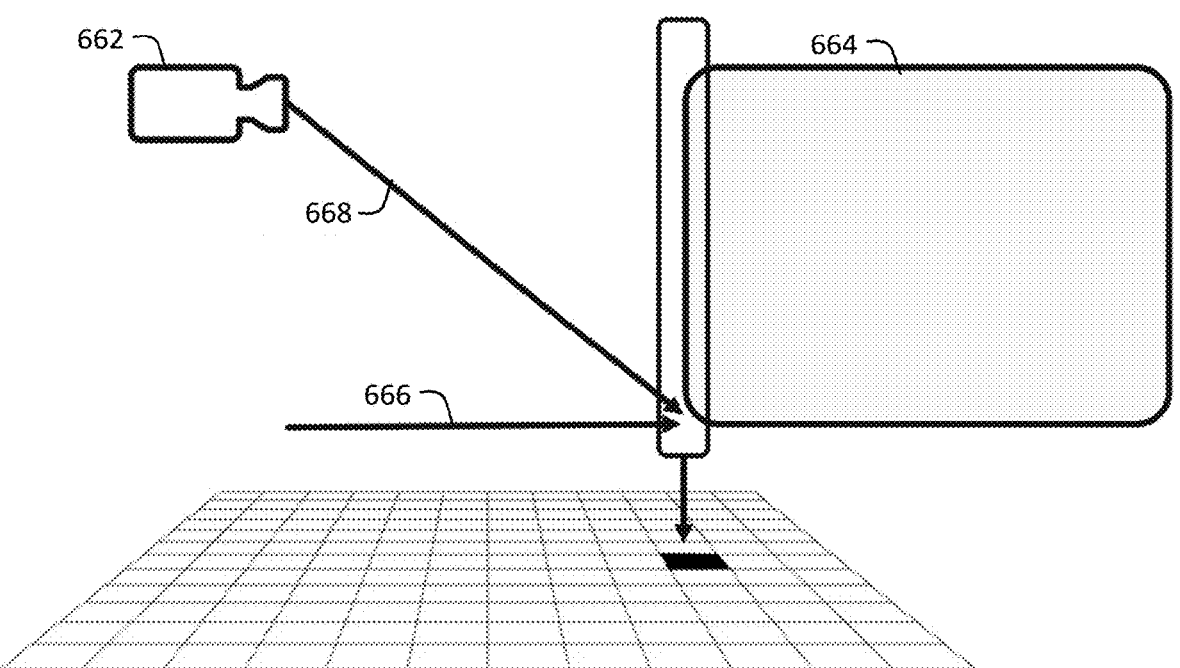

The depth vector may identify predicted likelihoods ($d1$-$d118$) that features for the corresponding ray are located at particular, corresponding depths. In certain implementations, depths indicated for the depth vector may be indicated using a radial depth (such as a distance from the image sensor that captured an image frame to the object depicted within the image frame). In additional or alternative implementations, depths indicated for the depth vector may be indicated as a ground-projected depth (such as a distance along the ground from ground-projected point beneath the image sensor that captured an image frame and a ground-projected point beneath the object depicted within the image frame). FIG. 6B depicts an imaging scenario 660 showing both a radial depth 668 and a ground-projected depth 666 between an image sensor 662 and an object 664.

For each ray, a separate outer product may be computed before features are pooled to form the top-down representation. In particular, the outer product for a first ray (indicated by (1) in the values) may be computed as:

| $d1(1)c1(1)$ | $d1(1)c2(1)$ | $\ldots$ | $\ldots$ | $d1(1)c80(1)$ |
|--------------|--------------|----------|----------|---------------|
| $d2(1)c1(1)$ | $d2(1)c2(1)$ | $\ldots$ | $\ldots$ | $d2(1)c80(1)$ |
| $\ldots$ | $\ldots$ | | | $\ldots$ |
| $\ldots$ | $\ldots$ | | | $\ldots$ |
| $d118(1)c1(1)$ | $d118(1)c2(1)$ | $\ldots$ | $\ldots$ | $d118(1)c80(1)$ |

The outer product for a second ray (indicated by (2) in the values may be computed as:

| | | | | |
|---|---|---|---|---|
| d1(2)c1(2) | d1(2)c2(2) | ... | ... | d1(2)c80(2) |
| d2(2)c1(2) | d2(2)c2(2) | ... | ... | d2(2)c80(2) |
| ... | ... | | | ... |
| ... | ... | | | ... |
| d118(2)c1(2) | d118(2)c2(2) | ... | ... | d118(2)c80(2) |

The outer product happens for each pixel in a vertical column in an image, and all rays with cells of the same depth summed together because each of the rays with the same depth will contribute to the same voxel in the BEV space. If a vertical column has 32 pixels, this outer-product should happen for each of the pixels and all 32 rays with cells with the same depth will contribute to same voxel on BEV space, thus they are summed up to form the top-down representation. For example, the top-down representation may be computed as:

| | | | | |
|---|---|---|---|---|
| d1(1)c1(1) + | d1(1)c2(1) + | ... | ... | d1(1)c80(1) + |
| d1(2)c1(2) + | d1(2)c2(2) + | | | d1(2)c80(2) + |
| ... + | ... + | | | ... |
| d1(32)c1(32) | d1(32)c2(32) | | | d1(32)c80(32) |
| d2(1)c1(1) + | d2(1)c2(1) + | ... | ... | d2(1)c80(1) + |
| d2(2)c1(2) + | d2(2)c2(2) + | | | d2(2)c80(2) + |
| ... + | ... + | | | ... |
| d2(32)c1(32) | d2(32)c2(32) | | | d2(32)c80(32) |
| ... | ... | | | ... |
| ... | ... | | | ... |
| d118(1)c1(1) + | d118(1)c2(1) + | ... | ... | d118(1)c80(1) + |
| d118(2)c1(2) + | d118(2)c2(2) + | | | d118(2)c80(2) + |
| ... + | ... | | | ... |
| d118(32)c1(32) | d118(32)c2(32) | | | d118(32)c80(32) |

Determining the top-down representation in this way is computationally intensive. To simplify these calculations for vertically-aligned images, a combined depth matrix may be determined by combining individual depth vectors for all rays in a vertical column (such as all 32 rays in the present example). The combined depth matrix may then be given as:

| | | | |
|---|---|---|---|
| d1(1) | d1(2) | ... | d1(32) |
| d2(1) | d2(2) | ... | d2(32) |
| ... | ... | | ... |
| ... | ... | | ... |
| ... | ... | | ... |
| d118(1) | d118(2) | ... | d118(32) |

Similarly, a combined context matrix may be determined by combining individual context vectors for all rays in a vertical column). The combined context matrix may then be given as:

| | | | | |
|---|---|---|---|---|
| c1(1) | c2(1) | ... | ... | c80(1) |
| c1(2) | c2(2) | ... | ... | c80(2) |
| ... | ... | | | ... |
| ... | ... | | | ... |
| ... | ... | | | ... |
| c1(32) | c2(32) | ... | ... | c80(32) |

In such instances, rather than needing to separately compute outer products that are then summed to form the top-down representation, the top-down representation may instead be more directly computed as the matrix multiplication of the combined depth matrix and the combined context matrix. In certain implementations, these techniques may significantly reduce the computational intensity. For example, the number of computations may scale as a factor of $N^2$, where N is the number of rays or pixels in a vertical column. In the above example, with 32 rays, computation time may be reduced by 80% of more (such as from 270 ms to 30 ms) without reducing the accuracy of the resulting top-down representation.

Before creating the top-down representation 410, 438, the computing device may verify that a spread measure for the corresponding cells 432 meets a predetermined threshold. For example, the spread measure can be determined as a voxel spread measure, which may be determined based on a distribution of voxel coordinates across a column. The voxel spread measure may be determined based on the absolute differences between the maximum and minimum x and y voxel values for cells within the column. As one skilled in the art will appreciate, a spread measure that meets the predetermined threshold may be greater than the predetermined threshold, less than the predetermined threshold, equal to the predetermined threshold, or combinations thereof.

One skilled in the art will appreciate that various techniques may be used to determine and map cells to form the top-down representation. For example, different processes may be used to implement the transform process 408. In certain implementations, the process 408 may be implemented as a lift and splat process. In such implementations, the corresponding cells 432 may be determined as part of a "lift" step of the LSS process and the top-down representation 410, 438 may be determined as part of a "splat" step of the LSS process.

Figure 5:
FIG. 5 is a flow chart illustrating an example method for determining a top-down representation of an environment around a vehicle according to one or more aspects of the disclosure.
Figure 5:
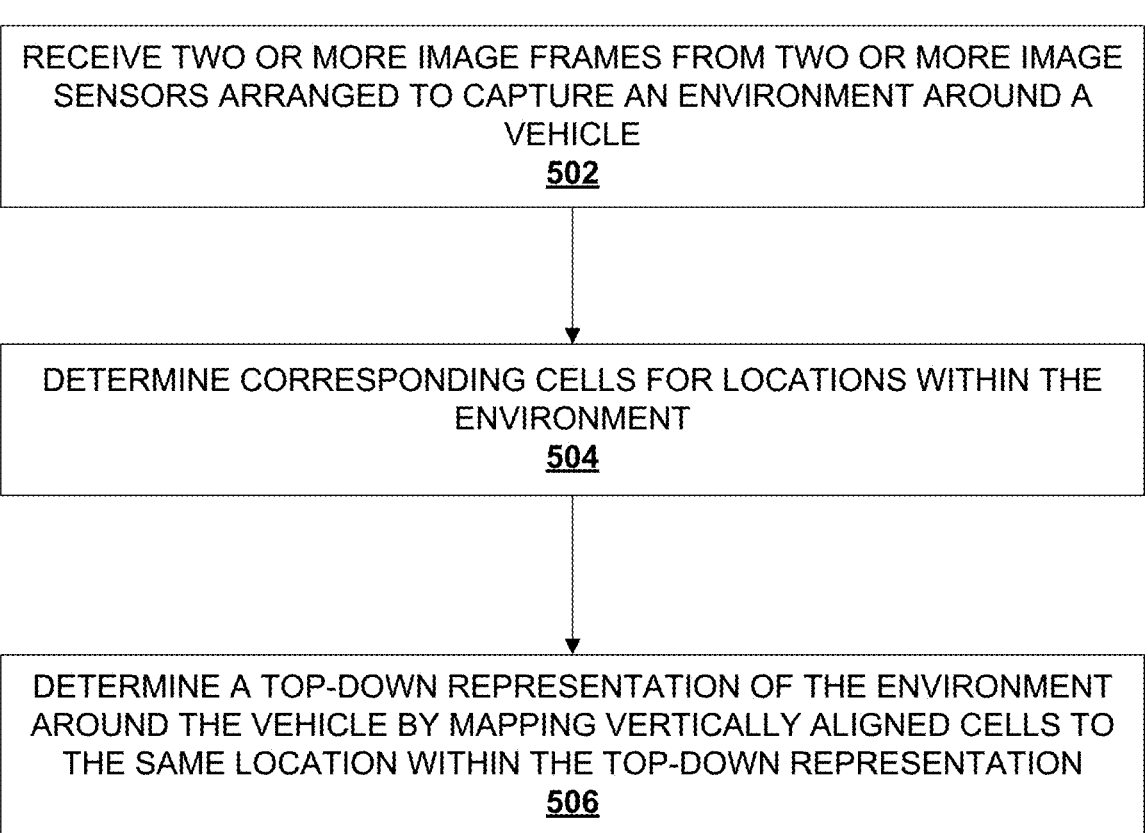

One method of performing image processing according to embodiments described above is shown in FIG. 5. FIG. 5 is a flow chart illustrating an example method for determining a representation of an environment around a vehicle. The method 500 may be performed by a computing device, such as the processing system in FIG. 2.

The method 400 includes receiving two or more image frames from two or more image sensors arranged to capture an environment around the vehicle (block 502). For example, the computing device may receive two or more image frames 402 from two or more image sensors arranged to capture an environment around the vehicle.

The method 400 includes determining corresponding cells for locations within the environment, each cell corresponds to at least one pixel within at least one of the two or more image frames (block 504). For example, the computing device may determine corresponding cells 432 for locations within the environment, each cell corresponds to at least one pixel within at least one of the two or more image frames 402. In certain implementations, the cells 432 are determined based on corresponding predicted depth information for pixels within the at least one of the two or more image frames 402.

The method 400 includes determining a top-down representation of the environment around the vehicle by mapping vertically aligned cells to the same location within the top-down representation (block 506). For example, the computing device may determine a top-down representation 410, 438 of the environment around the vehicle by mapping vertically aligned cells 432 to the same location within the top-down representation 410, 438. In certain implementations, the two or more image frames 402 are processed using a vertical scanning order to identify vertically aligned cells 432 while determining the top down representation of the environment.

In certain implementations, determining the top-down representation 410, 438 includes, for each location within the top-down representation 410, 438, determining a combined depth matrix by combining individual depth vectors for vertically aligned pixels within the two or more image frames 402, determining a combined context matrix by combining individual context vectors for vertically aligned pixels within the two or more image frames 402, and determining at least a portion of the top down representation by multiplying the combined depth matrix and the combined context matrix.

In certain implementations, the method 500 further includes determining, prior to determining the top-down representation 410, 438, that a spread measure for the corresponding cells 432 satisfies a predetermined threshold.

In certain implementations, the method 500 further includes, prior to determining the correspond cells 432, applying a rotation transform to at least one of the two or more image frames 402 correct for off-axis rotation of at least one of the two or more image sensors.

Figure 7:
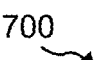
FIG. 7 is a flow chart illustrating an example method for determining projected images according to one aspect of the present disclosure.
Figure 7:
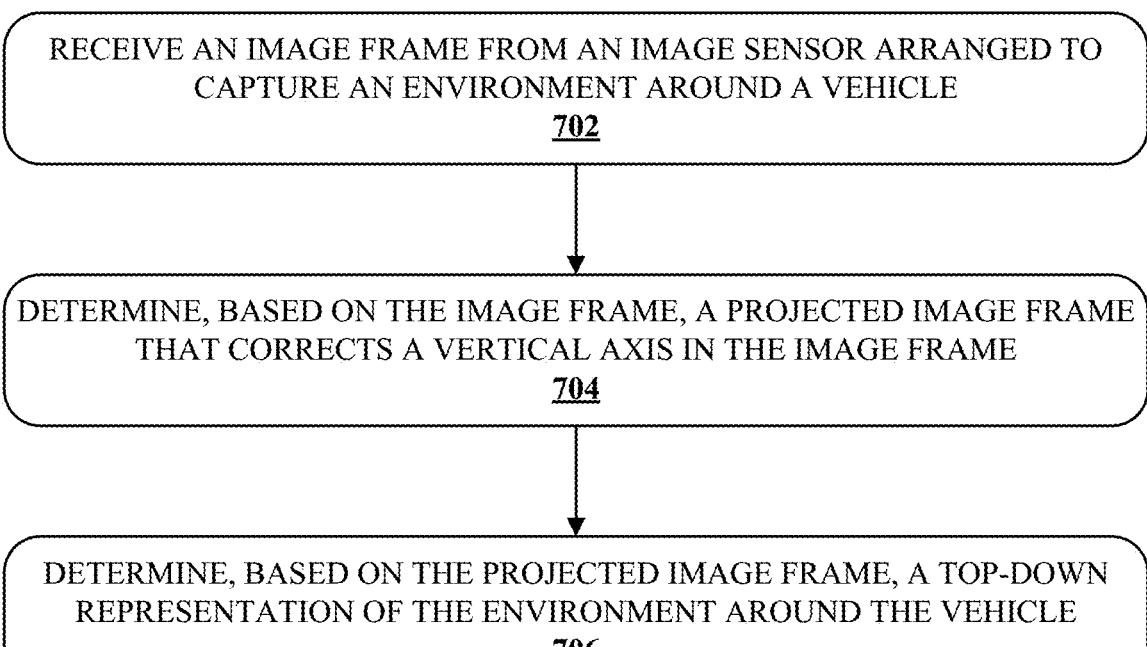

One method of performing image processing according to embodiments described above is shown in FIG. 7. FIG. 7 is a flow chart illustrating an example method 700 for determining projected image frames. The method 700 may be performed by a computing device, such as the processing system in FIG. 2.

The method 700 includes receiving in image frames from an image sensor arranged to capture an environment around a vehicle (block 702). For example, a computing device may receive an image frame from an image sensor that is arranged to capture an environment around a vehicle. In certain implementations, the image sensor may have a wide field of view (such as a field of you greater than or equal to 160°).

The method of 700 also includes determining, based on the image frame, a projected image frame (block 704). For example, the computing device may be configured to determine a projected image frame based on the image frame. In particular, the projected image frame may be determined to correct a vertical axis in the image frame. In certain implementations, the projected image frame may be determined according to a cylindrical family projection. In certain implementations, each column of pixels within the projected image frame corresponds to a respective yaw angle (such as a yaw angle relative to the image sensor, a yaw angle relative to the direction of travel for the vehicle, a yaw angle within a top-down representation of environment around a vehicle). In certain implementations, determining the projected image frame may include aligning the projected image frame with a vertical axis of the top-down representation.

The method 700 also includes determining, based on the projected image frame, a top-down representation of the environment around the vehicle (block 706). For example, the computing device may be configured to determine a top-down representation of the environment around the vehicle based on the projected image frame. In certain implementations, the top-down representation may be determined according to the techniques discussed in the method 500. For example, determining the top-down representation may include performing blocks 504, 506 of the method 500.

It is noted that one or more blocks (or operations) described with reference to FIGS. 5 and 7 may be combined with one or more blocks (or operations) described with reference to another of the figures. For example, one or more blocks (or operations) of FIG. 5 may be combined with one or more blocks (or operations) of FIG. 7. As another example, one or more blocks associated with FIG. 5 may be combined with one or more blocks associated with FIGS. 1-4C.

In one or more aspects, techniques for supporting vehicular operations may include additional aspects, such as any single aspect or any combination of aspects described below or in connection with one or more other processes or devices described elsewhere herein.

A first aspect provides a method comprising receiving an image frame from an image sensor arranged to capture an environment around a vehicle; determining, based on the image frame, a projected image frame that corrects a vertical axis in the image frame; and determining, based on the projected image frame, a top-down representation of the environment around the vehicle.

In a second aspect according to the first aspect, the projected image frame is determined according to a cylindrical family projection.

In a third aspect according to the second aspect, the projected image frame is determined using an equirectangular projection, a Mercator projection, a cylindrical projection, or a combination thereof.

In a fourth aspect according to any of the first aspect through the third aspect, each column of pixels within the projected image frame corresponds to a respective yaw angle within the top-down representation.

In a fifth aspect according to any of the first aspect through the fourth aspect, determining the projected image frame comprises aligning the projected image frame with a vertical axis of the top-down representation.

In a sixth aspect according to any of the first aspect through the fifth aspect, the image sensor has a field of view greater than or equal to 160 degrees.

In a seventh aspect according to any of the first aspect through the sixth aspect, determining the top-down representation of the environment around the vehicle comprises assigning vertically aligned pixels in the projected image frame to the same location within the top-down representation.

In an eighth aspect according to the seventh aspect, determining the top-down representation comprises, for each location within the top-down representation: determining a combined depth matrix by combining individual depth vectors for vertically aligned pixels within the projected image frame; determining a combined context matrix by combining individual context vectors for vertically aligned pixels within the projected image frame; and determining at least a portion of the top-down representation by multiplying the combined depth matrix and the combined context matrix.

In a ninth aspect according to the eighth aspect, the individual depth vectors are determined to indicate depth as a ground-projected distance.

In a tenth aspect according to any of the first aspect through the ninth aspect, the projected image frame is processed using a vertical scanning order to identify vertically aligned cells while determining the top-down representation of the environment.

An eleventh aspect provides an apparatus comprising a memory storing processor-readable code; and at least one processor coupled to the memory, the at least one processor being configured to execute the processor-readable code to cause the at least one processor to perform operations including receiving an image frame from an image sensor arranged to capture an environment around a vehicle; determining, based on the image frame, a projected image frame that corrects a vertical axis in the image frame; and determining, based on the projected image frame, a top-down representation of the environment around the vehicle.

In a twelfth aspect according to the eleventh aspect, the projected image frame is determined according to a cylindrical family projection.

In a thirteenth aspect according to the twelfth aspect, the projected image frame is determined using an equirectangular projection, a Mercator projection, a cylindrical projection, or a combination thereof.

In a fourteenth aspect according to any of the eleventh aspect through the thirteenth aspect, each column of pixels within the projected image frame corresponds to a respective yaw angle within the top-down representation.

In a fifteenth aspect according to any of the eleventh aspect through the fourteenth aspect, determining the projected image frame comprises aligning the projected image frame with a vertical axis of the top-down representation.

In a sixteenth aspect according to any of the eleventh aspect through the fifteenth aspect, the image sensor has a field of view greater than or equal to 160 degrees.

In a seventeenth aspect according to any of the eleventh aspect through the sixteenth aspect, determining the top-down representation of the environment around the vehicle comprises assigning vertically aligned pixels in the projected image frame to the same location within the top-down representation.

In an eighteenth aspect according to the seventeenth aspect, determining the top-down representation comprises, for each location within the top-down representation: determining a combined depth matrix by combining individual depth vectors for vertically aligned pixels within the projected image frame; determining a combined context matrix by combining individual context vectors for vertically aligned pixels within the projected image frame; and determining at least a portion of the top-down representation by multiplying the combined depth matrix and the combined context matrix.

In a nineteenth aspect according to the eighteenth aspect, the individual depth vectors arc determined to indicate depth as a ground-projected distance.

In a twentieth aspect according to any of the eleventh aspect through the nineteenth aspect, the projected image frame is processed using a vertical scanning order to identify vertically aligned cells while determining the top-down representation of the environment.

A twenty-first aspect provides a vehicle comprising an image capture device; a memory storing processor-readable code; and at least one processor coupled to the memory and the image capture device, the at least one processor being configured to execute the processor-readable code to cause the at least one processor to perform operations including receiving an image frame from the image capture device; determining, based on the image frame, a projected image frame that corrects a vertical axis in the image frame; and determining, based on the projected image frame, a top-down representation of an environment around the vehicle.

In a twenty-second aspect according to the twenty-first aspect, the projected image frame is determined according to a cylindrical family projection.

In a twenty-third aspect according to the twenty-second aspect, the projected image frame is determined using an equirectangular projection, a Mercator projection, an equidistant projection, a stereographic projection, a cylindrical projection, or a combination thereof.

In a twenty-fourth aspect according to any of the twenty-first aspect through the twenty-third aspect, each column of pixels within the projected image frame corresponds to a respective yaw angle within the top-down representation.

In a twenty-fifth aspect according to any of the twenty-first aspect through the twenty-fourth aspect, determining the projected image frame comprises aligning the projected image frame with a vertical axis of the top-down representation.

A twenty-sixth aspect includes a non-transitory computer-readable medium storing instructions that, when executed by a processor, cause the processor to perform operations including receiving an image frame from an image sensor arranged to capture an environment around a vehicle; determining, based on the image frame, a projected image frame that corrects a vertical axis in the image frame; and determining, based on the projected image frame, a top-down representation of the environment around the vehicle.

In a twenty-seventh aspect according to the twenty-sixth aspect, the projected image frame is determined according to a cylindrical family projection.

In a twenty-eighth aspect according to the twenty-seventh aspect, the projected image frame is determined using an equirectangular projection, a Mercator projection, an equidistant projection, a stereographic projection, a cylindrical projection, or a combination thereof.

In a twenty-ninth aspect according to any of the twenty-sixth aspect through the twenty-eighth aspect, each column of pixels within the projected image frame corresponds to a respective yaw angle within the top-down representation.

In a thirtieth aspect according to any of the twenty-sixth aspect through the twenty-ninth aspect, determining the projected image frame comprises aligning the projected image frame with a vertical axis of the top-down representation.

Components, the functional blocks, and the modules described herein with respect to FIGS. 1-4 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method comprising:

receiving an image frame from an image sensor arranged to capture an environment around a vehicle;

determining, based on the image frame, a projected image frame that corrects a vertical axis in the image frame; and determining, based on the projected image frame, a top-down representation of the environment around the vehicle, wherein determining the top-down representation of the environment around the vehicle comprises assigning vertically aligned pixels in the projected image frame to the same location within the top-down representation, and wherein determining the top-down representation comprises, for each location within the top-down representation:

determining a combined depth matrix by combining individual depth vectors for vertically aligned pixels within the projected image frame;

determining a combined context matrix by combining individual context vectors for vertically aligned pixels within the projected image frame; and determining at least a portion of the top-down representation by multiplying the combined depth matrix and the combined context matrix.

2. The method of claim 1, wherein the projected image frame is determined according to a cylindrical family projection.

3. The method of claim 2, wherein the projected image frame is determined using an equirectangular projection, a Mercator projection, a cylindrical projection, or a combination thereof.

4. The method of claim 1, wherein each column of pixels within the projected image frame corresponds to a respective yaw angle within the top-down representation.

5. The method of claim 1, wherein determining the projected image frame comprises aligning the projected image frame with a vertical axis of the top-down representation.

6. The method of claim 1, wherein the image sensor has a field of view greater than or equal to 160 degrees.

7. The method of claim 1, wherein the individual depth vectors are determined to indicate depth as a ground-projected distance.

8. The method of claim 1, wherein the projected image frame is processed using a vertical scanning order to identify vertically aligned cells while determining the top-down representation of the environment.

9. An apparatus, comprising:

a memory storing processor-readable code; and at least one processor coupled to the memory, the at least one processor configured to execute the processor-readable code to cause the at least one processor to perform operations including:

receiving an image frame from an image sensor arranged to capture an environment around a vehicle;

determining, based on the image frame, a projected image frame that corrects a vertical axis in the image frame; and determining, based on the projected image frame, a top-down representation of the environment around the vehicle, wherein determining the top-down representation of the environment around the vehicle comprises assigning vertically aligned pixels in the projected image frame to the same location within the top-down representation, and wherein determining the top-down representation comprises, for each location within the top-down representation:

determining a combined depth matrix by combining individual depth vectors for vertically aligned pixels within the projected image frame;

determining a combined context matrix by combining individual context vectors for vertically aligned pixels within the projected image frame; and determining at least a portion of the top-down representation by multiplying the combined depth matrix and the combined context matrix.

10. The apparatus of claim 9, wherein the projected image frame is determined according to a cylindrical family projection.

11. The apparatus of claim 10, wherein the projected image frame is determined using an equirectangular projection, a Mercator projection, a cylindrical projection, or a combination thereof.

12. The apparatus of claim 9, wherein each column of pixels within the projected image frame corresponds to a respective yaw angle within the top-down representation.

13. The apparatus of claim 9, wherein determining the projected image frame comprises aligning the projected image frame with a vertical axis of the top-down representation.

14. The apparatus of claim 9, wherein the image sensor has a field of view greater than or equal to 160 degrees.

15. The apparatus of claim 9, wherein the individual depth vectors are determined to indicate depth as a ground-projected distance.

16. The apparatus of claim 9, wherein the projected image frame is processed using a vertical scanning order to identify vertically aligned cells while determining the top-down representation of the environment.

17. A vehicle, comprising:

an image capture device;

a memory storing processor-readable code; and at least one processor coupled to the memory and the image capture device, the at least one processor configured to execute the processor-readable code to cause the at least one processor to perform operations including:

receiving an image frame from the image capture device;

determining, based on the image frame, a projected image frame that corrects a vertical axis in the image frame; and determining, based on the projected image frame, a top-down representation of an environment around the vehicle, wherein determining the top-down representation of the environment around the vehicle comprises assigning vertically aligned pixels in the projected image frame to the same location within the top-down representation, and wherein determining the top-down representation comprises, for each location within the top-down representation:

determining a combined depth matrix by combining individual depth vectors for vertically aligned pixels within the projected image frame;

determining a combined context matrix by combining individual context vectors for vertically aligned pixels within the projected image frame; and determining at least a portion of the top-down representation by multiplying the combined depth matrix and the combined context matrix.

18. The vehicle of claim 17, wherein the projected image frame is determined according to a cylindrical family projection.

19. The vehicle of claim 18, wherein the projected image frame is determined using an equirectangular projection, a Mercator projection, an equidistant projection, a stereographic projection, a cylindrical projection, or a combination thereof.

20. The vehicle of claim 17, wherein each column of pixels within the projected image frame corresponds to a respective yaw angle within the top-down representation.

21. The vehicle of claim 17, wherein determining the projected image frame comprises aligning the projected image frame with a vertical axis of the top-down representation.

22. A non-transitory computer-readable medium storing instructions that, when executed by a processor, cause the processor to perform operations comprising:

receiving an image frame from an image sensor arranged to capture an environment around a vehicle;

determining, based on the image frame, a projected image frame that corrects a vertical axis in the image frame; and determining, based on the projected image frame, a top-down representation of the environment around the vehicle, wherein determining the top-down representation of the environment around the vehicle comprises assigning vertically aligned pixels in the projected image frame to the same location within the top-down representation, and wherein determining the top-down representation comprises, for each location within the top-down representation:

determining a combined depth matrix by combining individual depth vectors for vertically aligned pixels within the projected image frame;

determining a combined context matrix by combining individual context vectors for vertically aligned pixels within the projected image frame; and determining at least a portion of the top-down representation by multiplying the combined depth matrix and the combined context matrix.

23. The non-transitory computer-readable medium of claim 22, wherein the projected image frame is determined according to a cylindrical family projection.

24. The non-transitory computer-readable medium of claim 23, wherein the projected image frame is determined using an equirectangular projection, a Mercator projection, an equidistant projection, a stereographic projection, a cylindrical projection, or a combination thereof.

25. The non-transitory computer-readable medium of claim 22, wherein each column of pixels within the projected image frame corresponds to a respective yaw angle within the top-down representation.

26. The non-transitory computer-readable medium of claim 22, wherein determining the projected image frame comprises aligning the projected image frame with a vertical axis of the top-down representation.

* * * * *